United States Patent
Garcia et al.

(10) Patent No.: US 7,492,108 B2
(45) Date of Patent: Feb. 17, 2009

(54) SYSTEM AND METHOD FOR DRIVING LIGHT-EMITTING DIODES (LEDS)

(75) Inventors: Getzel Gonzalez Garcia, Flower Mound, TX (US); Stephen Wesley Marshall, Richardson, TX (US); Steven Monroe Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 97 days.

(21) Appl. No.: 11/201,505

(22) Filed: Aug. 11, 2005

(65) Prior Publication Data

US 2007/0035538 A1 Feb. 15, 2007

(51) Int. Cl.
*H05B 37/02* (2006.01)
(52) U.S. Cl. .................. 315/291; 315/307; 315/308; 315/312
(58) Field of Classification Search .......... 315/291, 315/294, 297, 301, 307, 169.3, 308, 309, 315/312; 323/234, 236; 353/31, 94
See application file for complete search history.

(56) References Cited

U.S. PATENT DOCUMENTS

| | | | |
|---|---|---|---|
| 6,072,458 A | 6/2000 | Asakawa et al. | |
| 6,400,101 B1 * | 6/2002 | Biebl et al. | 315/291 |
| 6,717,559 B2 | 4/2004 | Weindorf | |
| 6,734,639 B2 * | 5/2004 | Chang et al. | 315/291 |
| 6,963,175 B2 * | 11/2005 | Archenhold et al. | 315/291 |
| 7,061,394 B2 * | 6/2006 | Biebl | 345/48 |
| 7,165,845 B2 * | 1/2007 | Takeda et al. | 353/31 |
| 2003/0218794 A1 | 11/2003 | Takeda et al. | |

* cited by examiner

*Primary Examiner*—Douglas W Owens
*Assistant Examiner*—Ephrem Alemu
(74) *Attorney, Agent, or Firm*—W. James Brady, III; Frederick J. Telecky, Jr.

(57) ABSTRACT

System and method for improving efficiency in driving LEDs. A preferred embodiment comprises a switch current regulator coupled to a current control signal input, the switch current regulator to control an amount of current provided to the LED based upon a magnitude of a voltage on the current control signal input, a switching voltage regulator coupled to the switch current regulator and the LED, the switching voltage regulator to provide current to the LED, and a sensor coupled to the switch current regulator, the LED, and a signal feedback circuit, the sensor to measure status information regarding the switch current regulator and the LED and provides the information to a controller, wherein the status information can be used to adjust the current on the current control signal input.

23 Claims, 3 Drawing Sheets

SYSTEM AND METHOD FOR DRIVING LIGHT-EMITTING DIODES (LEDS)

TECHNICAL FIELD

The present invention relates generally to a system and method for display systems, and more particularly to a system and method for improving efficiency in driving LEDs.

BACKGROUND

Projection display systems have typically used ultra-high pressure (UHP) arc lamps to provide necessary light needed to project an image (or a sequence of images) on a display screen. The UHP arc lamps provide adequate brightness and have long life. Unfortunately, the UHP arc lamps consume a large amount of power and produce a lot of heat.

Recently, LEDs have come to market that have been able to produce light at intensity levels rivaling that of the UHP arc lamps, especially when multiple LEDs are used in conjunction. LEDs have an advantage in that it is possible to use narrow-spectrum LEDs that produce light with specific colors, whereas the UHP arc lamps produce broad-spectrum light. Additionally, LEDs consume less power and produce less heat when compared to the UHP arc lamps. Furthermore, LEDs tend to have longer life than UHP arc lamps.

One disadvantage of the prior art is that LEDs can be more expensive than UHP arc lamps. This can be further exacerbated by the fact that multiple LEDs may be required to replace a single UHP arc lamp due to the narrow-spectrum nature of LEDs as well as the LEDs' lower light output levels. This can lead to more expensive and complex display systems as well as potentially decrease reliability.

A second disadvantage of the prior art is that in order to optimize the power consumption of the LEDs, as well as increase useful life and light output, LEDs cannot simply be turned on. Drive currents for the LEDs may need monitoring as well as regulation and modulation. Therefore, driver circuitry may be needed to control the drive current of the LEDs. This can further result in a more expensive and complex display system.

SUMMARY OF THE INVENTION

These and other problems are generally solved or circumvented, and technical advantages are generally achieved, by preferred embodiments of the present invention which provides a system and method for improving efficiency in driving LEDs.

In accordance with a preferred embodiment of the present invention, a circuit is provided. The circuit includes a switch current regulator connected to a current control signal input. The switch current regulator controls a current provided to a light-emitting diode based upon a magnitude of a voltage on the current control signal input. The circuit also includes a switching voltage regulator connected to the switch current regulator and the LED. The switching voltage regulator provides current to the LED. The circuit further includes a sensor connected to the switch current regulator, the LED, and a signal feedback circuit. The sensor measures status information about the switch current regulator and the LED and provides the status information to a controller via the signal feedback circuit. At the controller, the status information can be used to adjust the voltage on the current control signal input.

In accordance with another preferred embodiment of the present invention, a display system is provided. The display system includes a light source, a display device, and a controller. The light source can include a light-emitting diode (LED) and an LED driver circuit, which includes a switch current regulator connected to a current control signal input. The switch current regulator controls a current provided to a light-emitting diode based upon a magnitude of a voltage on the current control signal input. The circuit also includes a switching voltage regulator connected to the switch current regulator and the LED. The switching voltage regulator provides current to the LED. The circuit further includes a sensor connected to the switch current regulator, the LED, and a signal feedback circuit. The sensor measures status information about the switch current regulator and the LED and provides the status information via the signal feedback circuit. The display device displays image data stored in a memory, while the controller receives status information from the sensor in the LED driver circuit and adjusts the magnitude of the current on the current control signal input and controls the display of image data by the display device.

In accordance with another preferred embodiment of the present invention, a method for illuminating a light-emitting diode (LED) is provided. The method includes sensing status information when an LED driver circuit is active, providing the status information to a controller, and sending instructions to the LED driver circuit to adjust an output voltage of the LED driver circuit based upon the status information.

An advantage of a preferred embodiment of the present invention is that current source circuitry for the LEDs are operated with minimum heat dissipation requirements for a desired LED light output level. This therefore leads to a more efficient power supply, reduced power consumption, and increased useful life for the driver circuitry of the LEDs.

A further advantage of a preferred embodiment of the present invention is that it is possible to rapidly attenuate light output levels of the LEDs to a desired level so that it is possible to change light output levels between rapidly changing images being displayed by the display system, rather than slowly changing light output levels between multiple images. This can result in improved control of image quality as well as power consumption.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a display system using LEDs as light sources. The invention may also be applied, however, to other applications wherein there is a need to efficiently provide power to high light output LEDs that consume large amounts of current to optimize power consumption and maximize product life, such as light beacons, road warning markers, lights, and so forth.

Figure 1:
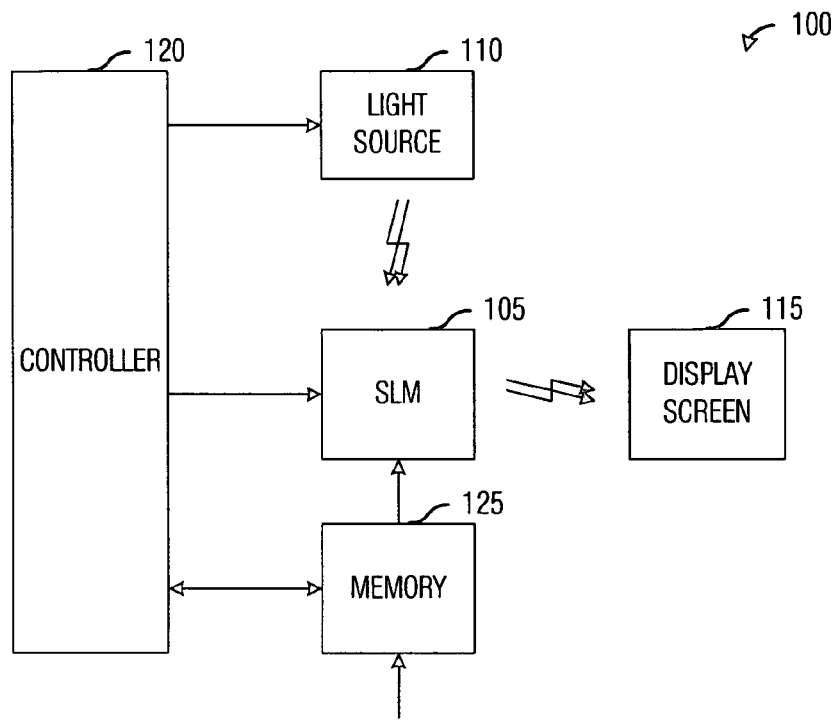
FIG. 1 is a diagram of an exemplary display system.

With reference now to FIG. 1, there is shown a diagram illustrating an exemplary display system 100, wherein LEDs are used to provide light for use by a spatial light modulator (SLM). The display system 100 uses an SLM 105, such as a digital micromirror device (DMD), to modulate light provided by a light source 110, which can comprise one or more LEDs. Light reflected from the SLM 105 can be displayed on a display screen 115. A controller 120 can control the operation of the SLM 105, the light source 110, and a memory 125. The memory 125 can buffer image data (such as images to be displayed by the display system 100) that can be provided to the SLM 105. The image data can be used to set the state of light modulators, such as micromirrors in a DMD, in the SLM 105.

Figure 2:
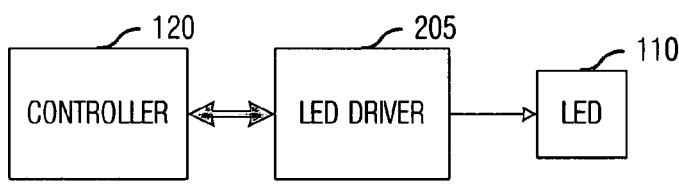
FIG. 2 is a diagram of an exemplary light source with support hardware of a display system, wherein LEDs are used to provide light.

With reference now to FIG. 2, there is shown a diagram illustrating a view of an exemplary light source with support hardware of a display system, wherein one or more LEDs are used to provide light. The diagram shown in FIG. 2 can be a detailed view of a light producing portion of the display system 100 (FIG. 1). Two significant advantages in using LEDs to provide light for a display system is that the LEDs can be turned on and off rapidly and the LEDs can provide light at different intensity levels. The ability to rapidly turn on and off combined with the capability to produce light at different intensity levels can help to increase the image quality of the display system by increasing the bit-depth and the contrast ratio of the display system as well as providing the ability to adjust the tone and hue of the images being displayed to optimize viewing quality.

In order to control the LEDs, an LED driver circuit 205 may be needed to regulate a drive current being used to illuminate the LED 110. The LED driver circuit 205, coupled in between the controller 120 and the LED 110, may have adequate intelligence to take LED instructions provided by the controller 120 and translate them into the drive current that is provided to the LED 110. For example, the controller 120 may issue an instruction to turn on the LED 110 and the LED driver circuit 205 can turn on the drive current in order to illuminate the LED 110. If the controller 120 issues an instruction to reduce the LED's light output intensity by 50%, the LED driver circuit 205 can reduce the drive current by an amount necessary to reduce the LED's light output by 50%, with the reduction in the drive current being dependent upon the characteristics of the LED 110. The drive current provided by the LED driver circuit 205 may not be a simple signal that controls the illumination of the LED 110 by its magnitude. For example, the drive current may be a pulse width modulated (PWM) signal that controls the illumination by the width (duty cycle) of the pulses of the signal provided to the LED 110. Alternatively, the LED driver circuit 205 may be relatively simple and may require that the controller 120 provide the actual drive signal to be used to illuminate the LED 110.

Figure 3:
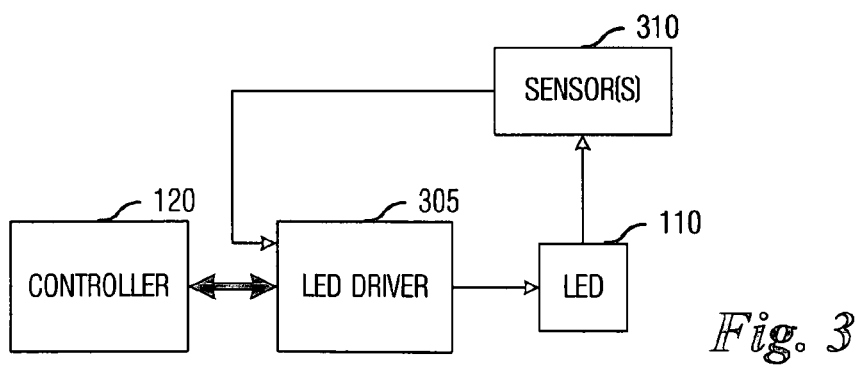
FIG. 3 is a diagram of a light source with support hardware of a display system, wherein the support hardware enables the optimization of power dissipation, according to a preferred embodiment of the present invention.

With reference now to FIG. 3, there is shown a diagram illustrating a light source with support hardware of a display system, wherein the support hardware enables the optimization of power dissipation, according to a preferred embodiment of the present invention. The diagram shown in FIG. 3 can be a detailed view of a light producing portion of the display system 100 (FIG. 1). Due to material and manufacturing variability, it may not be possible to produce LEDs and driver circuitry (such as transistors) that operate and behave identically. Therefore, the use of preprogrammed drive signals, voltage and current magnitudes, and so forth may not result in optimal heat dissipation and light output levels. To enable the optimization of heat dissipation and light output levels, it may be necessary to monitor voltage and current magnitudes and to make necessary adjustments.

The diagram shown in FIG. 3 illustrates an LED 110 that can be driven by LED instructions provided by a controller 120 via an LED driver circuit 305. The LED driver circuit 305 can translate the LED instructions from the controller 120 into a drive current that can be used to illuminate the LED 110. A sensor (or sensors) 310 can be used to detect voltage and current magnitudes, temperatures, and so forth of the LED 110, the drive current, driver circuitry, or so on, and feed the information back to the LED driver circuit 305 which can make necessary adjustments to the drive current to optimize the operation of the LED 110. The feedback information from the sensor 310 can be used directly by the LED driver circuit 305 or be provided to the controller 120, which can issue additional LED instructions to the LED driver circuit 305 to make the necessary adjustments to the drive current. For example, the sensor 310 may detect an operating temperature of the LED 110 to help prevent overheating of the LED 110, which can lead to shortened operating life, the sensor 310 may detect a voltage across a drive transistor in the LED driver circuit 305 to ensure that the drive transistor is operating in a current source mode with minimum dissipation, and so on. Additionally, the sensor 310 may detect other status information about the LED 110, such as LED current and LED voltage. This status information can also be used to adjust the LED driver circuit 305. Furthermore, the sensor 310 may also detect status information regarding a transistor (or transistors) used to provide current to the LED 110, with the status information be used to adjust the LED driver circuit 305.

Figure 4:
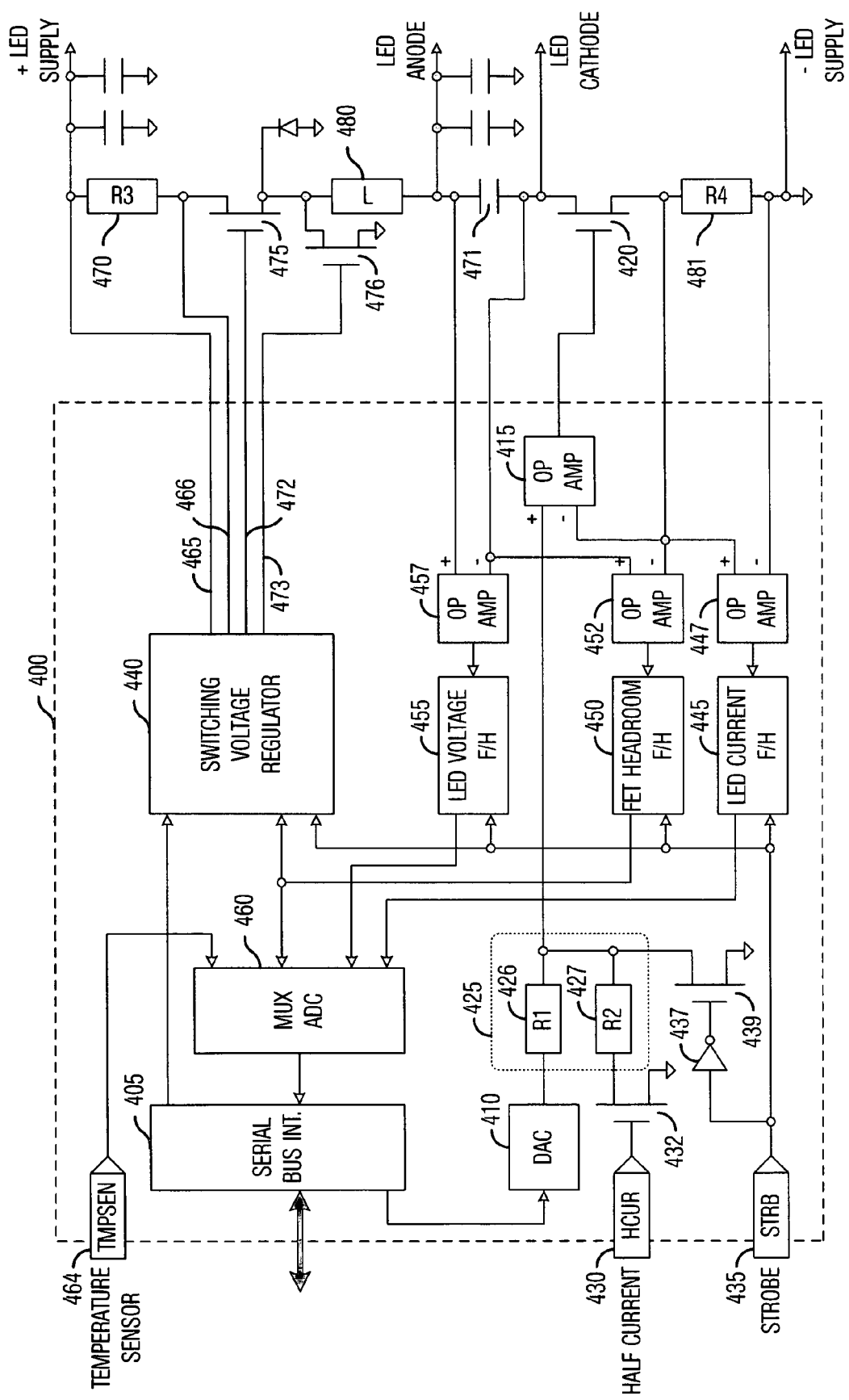
FIG. 4 is a diagram of an exemplary LED driver circuit, according to a preferred embodiment of the present invention.

With reference now to FIG. 4, there is shown a diagram illustrating a detailed view of an exemplary LED driver circuit 400, according to a preferred embodiment of the present invention. The LED driver circuit 400 shown in FIG. 4 may be an implementation of the LED driver circuit 305 (FIG. 3). The LED driver circuit 400 includes a bus interface unit 405, which can be responsible for serving as an intermediary between a controller, such as the controller 120 (FIG. 3) and the LED driver circuit 400. The bus interface unit 405 can both send and receive commands as well as data on a communications bus. The communications bus can either be a parallel or serial communications bus, with a serial communications bus shown in FIG. 4. Instructions from the controller 120 can be converted into a representation of a drive signal by a digital-to-analog converter (DAC) 410. The representation of the drive signal can be used to control the drive signal that is provided to an LED 110 and may be provided to an operational amplifier 415, preferably a plus (positive) terminal, with an output of the operational amplifier 415 being coupled to a gate terminal of a transistor 420. A negative terminal of the operational amplifier 415 may be coupled to a source terminal of the transistor 420 and to a resistor 481 to create a current control closed loop. The amplified output of the operational amplifier 415 can adjust accordingly to control the state of the transistor 420 to maintain the voltage at the negative terminal equal to the plus terminal voltage minus an offset voltage. The current provided to an LED 110 will be substantially equal to the voltage at the negative terminal of the operational amplifier 415 divided by a resistance of the resistor 481. According to a preferred embodiment of the present invention, the transistor 420 can be implemented as a high power transistor, preferably a field-effect transistor (FET). Due to the high power requirements of the transistor 420, it may not be possible to integrate the transistor 420 on a same integrated circuit as the LED driver circuit 400. A preferred embodiment would have the transistor 420 as a stand-alone device attached to a large heat sink.

Coupled in between the DAC 410 and the operational amplifier 415 can be a resistor-divider network 425. The resistor-divider network 425 comprises a first resistor 426 and a second resistor 427, with the first resistor 426 arranged serially between the DAC 410 and the operational amplifier 415 and the second resistor 427 arranged in parallel to the first resistor 426. If the first resistor 426 and the second resistor 427 have substantially equal resistances, then the resistor-divider network 425 can be used to almost instantaneously halve the output current of the DAC 410. In a display system, this ability can enable the addition of an additional bit of bit-depth and therefore improve image quality. A half current input "HCUR" 430 coupled to a transistor 432 can switch on/off the resistor-divider network 425. According to another preferred embodiment of the present invention, a more elaborate resistor-divider network can be used in place of the resistor-divider network 425 and can enable the near instantaneous reduction of the current of the DAC 410 by a multitude of levels. This can result in the addition of more than one bit of bit-depth to the display system.

According to a preferred embodiment of the present invention, rather than providing a continuous current to the LED 110, the drive current is provided in pulses (or strobes), which can be more readily controlled in a precise manner. A strobe input "STRB" 435 can be used to effectively pulse current from the output of the DAC 410 to the LED 110. An inverter 437 can couple the strobe input "STRB" 435 to a gate terminal of a transistor 439 that is coupled in parallel to the output of the DAC 410. The transistor 439 can then couple the output of the DAC 410 to electrical ground and provide a current path to the electrical ground. In addition to being coupled to the output of the DAC 410, the strobe input "STRB" 435 can also be coupled to a switching voltage regulator 440, an LED current follow and hold unit 445, a FET headroom follow and hold unit 450, and an LED voltage follow and hold unit 455. The strobe input "STRB" 435 can function as an enable circuit for these units, i.e., when the strobe input "STRB" 435 is active, the units that are coupled to it can be enabled.

The switching voltage regulator 440 can provide voltages at a variety of different levels, each of which can be programmable by a designer of the LED driver circuit 400. The switching voltage regulator 440 can regulate voltage levels based upon the strobe input "STRB" 435 and FET headroom voltage. When the strobe input "STRB" 435 is not active, the switching voltage regulator can maintain the voltage at a previously regulated level. The three follow and hold units (the LED current follow and hold unit 445, the FET headroom follow and hold unit 450, and the LED voltage follow and hold unit 455) can be basically sample and hold circuits that are reconfigured to sample and hold a value at an input when the strobe input "STRB" 435 becomes active. The LED current follow and hold unit 445 maintains a value that can be representative of the current being drawn by the LED 110, the FET headroom follow and hold unit 450 maintains a value that can be representative of a voltage drop across the source and drain terminals of the transistor 420, and the LED voltage follow and hold unit 455 maintains a value that can be representative of a voltage drop across the anode and cathode terminals of the LED 110.

Each of the three follow and hold units has an output that can be coupled to a multiplexing analog to digital converter (ADC) 460 that can be used to convert signals at its multiple inputs into their digital representations to be provided to the bus interface 405. The digital representations of the signals at the inputs of the multiplexing ADC 460, such as the values maintained by the LED current follow and hold unit 445, the FET headroom follow and hold unit 450, and the LED voltage follow and hold unit 455 can be communicated to the controller 120. The controller 120 can then issue LED commands to make any necessary adjustments to the drive current of the LED 110 to optimize the heat dissipation of the transistor 420, the light output of the LED 110, and so on. The output of the FET headroom follow and hold unit 450 can also be provided to the switching voltage regulator 440, where the value can be used to regulate voltage levels.

Each of the three follow and hold units has as an input, an output of an operational amplifier. A first operational amplifier 447 has an output that is an input to the LED current follow and hold unit 445. The first operational amplifier 447 can be used to measure a voltage potential across resistor 481. The voltage drop across the resistor 481 provides an indicator of the current drawn by the LED 110. A second operational amplifier 452 has an output that is an input to the FET headroom follow and hold unit 450. The second operational amplifier 452 can be used to measure a voltage potential on different terminals of the transistor 420 and can provide an indicator of the voltage drop across the source and drain terminals of the transistor 420. A third operational amplifier 457 can be used to measure a voltage potential across a capacitor 471 and provides an indicator of a voltage drop across the LED 110.

In addition to the three follow and hold units providing information such as LED current, LED voltage, and FET voltage, a temperature sensor (not shown) can be used to monitor an operating temperature of the LED 110. The temperature sensor can provide temperature information to the LED driver circuit 400 via a temperature sensor signal input "TMPSEN" 464. The temperature information can then be digitized by the multiplexing ADC 460 for communication back to the controller 120 where the temperature information can be used to make any necessary adjustments to the drive current of the LED 110 to optimize the heat dissipation of the transistor 420, the light output of the LED 110, and so on.

The switching voltage regulator 440 can be used to provide regulated voltage to the LED 110 and can have at least four connections to circuitry used to provide drive current to the LED 110. A first output 465 of the switching voltage regulator 440 may simply provide at an output of the switching voltage regulator 440 a voltage potential that is substantial the same as an input voltage to the switching voltage regulator 440. The first output 465 can be coupled to a positive LED voltage supply (+LED SUPPLY). The switching voltage regulator 440 may have a feedback sense connection 466 that can be used by the switching voltage regulator 440 to monitor current in the circuitry used to provide drive current to the LED 110. The feedback sense connection 466 can measure a voltage drop across a resistor 470, commonly referred to as a sense resistor.

A second output 472 can be used to switch a transistor 475 on and off. Switching the transistor 475 on and off can reduce the input voltage (+LED SUPPLY) to a level required at an anode terminal of the LED 110. A third output 473 can be used to switch a transistor 476 on and off. While the second output 472 has the transistor 475 switched on, the third output 473 has the transistor 476 switched off, and vice versa. The transistor 475 and the transistor 476 can alternate offering synchronous rectification and provide maximum efficiency. According to a preferred embodiment of the present invention, the duty cycle of the transistor 475 and the transistor 476 can depend upon on a ratio of output voltage to input voltage.

During the switching that occurs between the transistor 475 and the transistor 476, the +LED SUPPLY can be momentarily coupled to an inductor 480, permitting the inductor 480 to store energy in its magnetic field. The energy stored in the magnetic field of the inductor 480 can then be used to provide the drive current to the LED 110. The drive current can be provided to the LED 110 through the LED ANODE terminal. The drive current drawn by the LED 110 can be regulated by a current path through the transistor 420 and a resistor 481 using current sense feedback, either to a negative power supply (−LED SUPPLY) or electrical ground, with the transistor 420 being used to regulate the drive current by using current sense feedback.

Figures 5A, 5B:
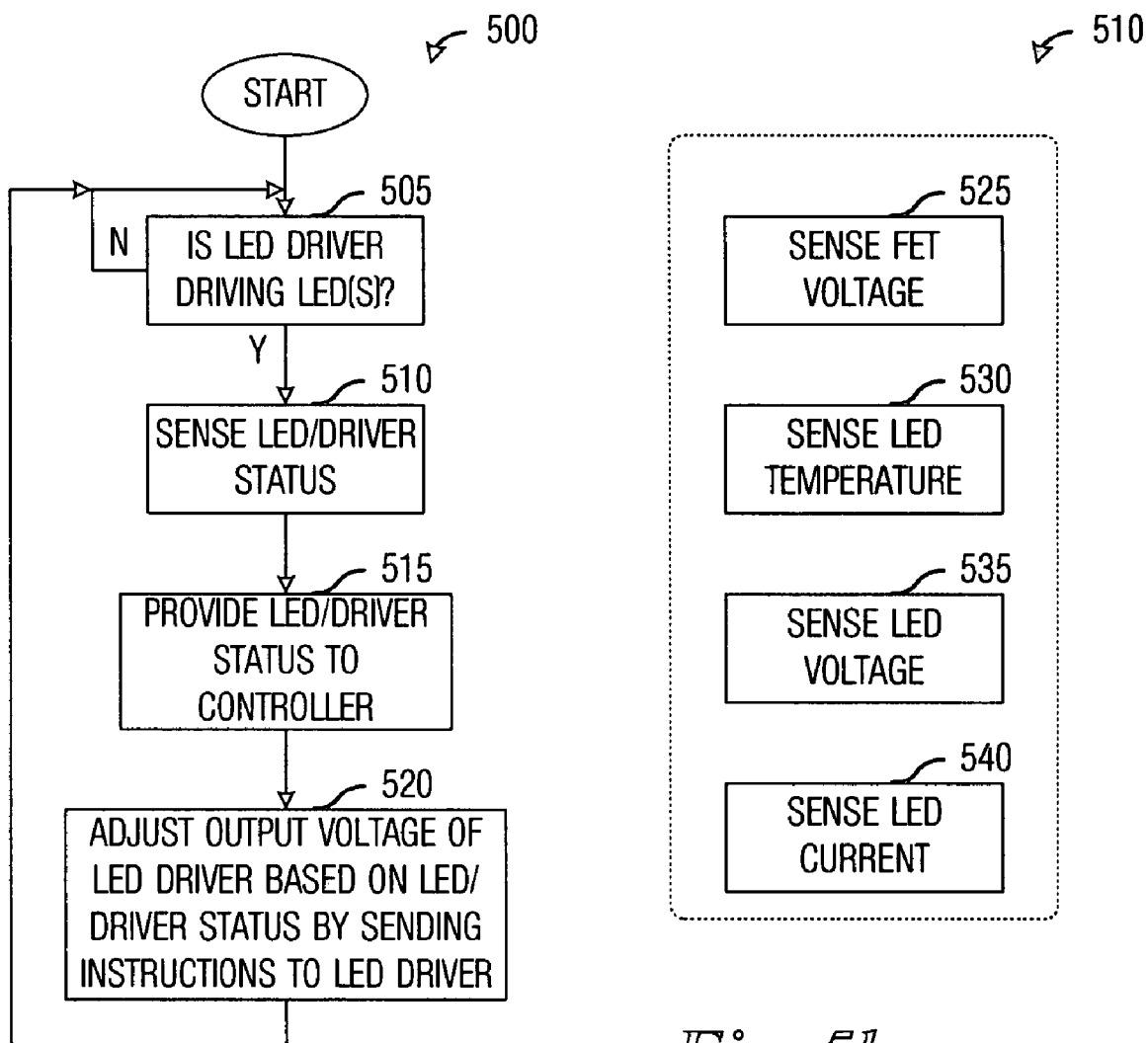
FIGS. 5a and 5b are diagrams of a sequence of events describing the operation of an LED driver circuit, according to a preferred embodiment of the present invention.

With reference now to FIGS. 5a and 5b, there are shown diagrams illustrating a sequence of events 500 describing the operation of an LED driver circuit, according to a preferred embodiment of the present invention. The sequence of events 500 shown in FIG. 5a, may be illustrative of the operation of an LED driver circuit, such as the LED driver circuit 305 (FIG. 3), wherein the LED driver circuit 305 makes use of sensors (such as sensor 310 (FIG. 3)) to adjust output voltage to ensure that an LED (or LEDs) being driven by the LED driver circuit 305 is providing maximized light output and minimizing power dissipation.

Since the operation of the LED driver circuit 305 is pulsed (or strobed), the LED driver circuit 305 provides current to illuminate an LED, such as LED 110 (FIG. 1), only when a pulse controlling the operation of the LED driver circuit 305 is active or when the LED driver circuit 305 being strobed, such as shown in FIG. 4. When the pulse is active, the LED driver circuit 305 is providing current to the LED 110 to illuminate the LED 110. The sequence of events 500 can then begin with a determination if the LED driver circuit 305 is driving the LED 110 (block 505). If the LED driver circuit 305 is not driving the LED 110, then no current is being provided to the LED 110 and the LED 110 is not being illuminated. Therefore, the LED is also not dissipating any heat.

If the LED driver circuit 305 is operating, i.e., the pulse is active, then a status of the LED 110 and/or the LED driver circuit 305 can be sensed (block 510). According to a preferred embodiment of the present invention, the sensing of the status of the LED 110 and/or the LED driver circuit 305 can be accomplished via the use of sensors, such as the sensor 310 (FIG. 3), or with follow and hold units, such as the LED current follow and hold unit 445 (FIG. 4) and so forth. With reference to FIG. 5b, status information provided by the sensor 310 and/or follow and hold units, can include information such as transistor (FET) voltage (or headroom) 525, LED temperature 530, LED voltage 535, LED current 540, and so forth. The status information can then be sent to a controller, such as the controller 120 (FIG. 3) (block 515). The controller can be responsible for controlling the operation of the LED driver circuit 305. Information from the sensor 310 and various follow and hold units can then be used by the controller 120 to make adjustments to the output voltage (and output current) of the LED driver circuit 305 (block 520). The controller 120 can change voltage control instructions provided to the LED drive circuit 305 to change the output voltage of the LED driver circuit 305. The monitoring of the LED drive circuit 305 is continuous in nature and once adjustments have been made to the output voltage of the LED drive circuit 305, the operation of the LED drive circuit 305 continues by returning to block 505.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:
   a switch current regulator, including a first transistor, coupled to a current control signal input, the switch current regulator configured to control a current provided to a light-emitting diode (LED) based upon a magnitude of a voltage on the current control signal input;
   a switching voltage regulator coupled to the switch current regulator and the LED using a second different transistor, the switching voltage regulator configured to provide current to the LED; and
   a sensor coupled to the switch current regulator, the LED, and a signal feedback circuit, the sensor configured to measure status information regarding the switch current regulator and the LED and provide the status information to a controller via the signal feedback circuit, wherein the status information is used to adjust the voltage on the current control signal input, wherein the sensor comprises
      an LED voltage sensor coupled to an anode terminal of the LED and a cathode terminal of the LED, the LED voltage sensor configured to measure a voltage drop across the LED, and
      an LED current sensor coupled to the LED, the LED current sensor configured to measure a current flowing through the LED.

2. The circuit of claim 1 further comprising a resistor network coupled in between the current control signal input and the switch current regulator, the resistor network configured to divide the current on the current control signal input based upon a value of a current divide signal.

3. The circuit of claim 2, wherein the resistor network comprises two resistors with substantially equal resistances, a first resistor coupled in between the current control signal input and the switch current regulator and a second resistor coupled in between the first resistor and electrical ground, and wherein the resistor network divides the current on the current control signal input by two (2) when the current divide signal is active.

4. The circuit of claim 3, wherein the current divide signal is active when there is a need to rapidly halve the current on the current control signal input.

5. The circuit of claim 1, wherein the sensor comprises:
   a switch headroom sensor coupled to the switch current regulator, the switch headroom sensor configured to measure a voltage drop across the switch current regulator.

6. The circuit of claim 5, wherein the sensor further comprises a temperature sensor coupled to the LED, the temperature sensor configured to measure a temperature of the LED.

7. The circuit of claim 5, wherein the switch is a field-effect transistor, and wherein the switch headroom sensor measures if the switch current regulator is operating in a current source mode with minimum dissipation.

8. The circuit of claim 1 further comprising a strobe signal input coupled to the switching voltage regulator and the sensor, wherein the switching voltage regulator and the sensor are configured to operate only when a signal on the strobe signal input is in an active state.

9. The circuit of claim 1 further comprising an inductor coupled between a positive potential of the switching voltage regulator and an anode terminal of the LED, the inductor configured to provide current to the LED.

10. The circuit of claim 1, wherein the current provided to the LED is regulated based upon adjusting the voltage of a current control signal input by a digital-to-analog converter to an operational amplifier with a negative feedback current control loop to the switch current regulator.

11. The circuit of claim 10 further comprising feedback loop from a voltage drop across the switch current regulator to control the switching regulator voltage and ensure that the switch current regulator is operating in a current source mode with minimum dissipation.

12. A display system comprising:
a light source comprising:
  a light-emitting diode (LED);
  an LED driver circuit comprising:
    a switch current regulator, including a first transistor, coupled to a current control signal input, the switch current regulator configured to control a current provided to the LED based upon a magnitude of a voltage on the current control signal input;
    a switching voltage regulator coupled to the switch current regulator and the LED using a second different transistor, the switching voltage regulator configured to provide current to the LED;
    a sensor coupled to the switch current regulator, the LED, and a signal feedback circuit, the sensor configured to measure status information regarding the switch current regulator and the LED, wherein the sensor provides status information using the signal feedback circuit, wherein the current provided to the LED is regulated based upon adjusting the voltage of a current control signal input by a digital-to-analog converter to an operational amplifier with a negative feedback current control loop to the switch current regulator;
the display system further comprising:
  a display device configured to display image data stored in a memory; and
  a controller coupled to the LED driver circuit and the display device, the controller configured to receive the status information from the sensor in the LED driver circuit, adjust the magnitude of the current on the current control signal input, and control the display of image data by the display device.

13. The display system of claim 12, wherein the light source comprises a plurality of LEDs.

14. The display system of claim 13, wherein individual LEDs in the plurality of LEDs produce light at different wavelengths.

15. The display system of claim 12 further comprising a display screen coupled to the display device, the display screen to permit viewing of displayed image data.

16. The display system of claim 12, wherein the display device is a spatial light modulator.

17. The display system of claim 16, wherein the display device is a digital micromirror device (DMD).

18. A circuit comprising:
  a switch current regulator coupled to a current control signal input, the switch current regulator configured to control a current provided to a light-emitting diode (LED) based upon a magnitude of a voltage on the current control signal input;
  a switching voltage regulator coupled to the switch current regulator and the LED, the switching voltage regulator configured to provide current to the LED;
  a resistor network coupled in between the current control signal input and the switch current regulator, the resistor network configured to divide the current on the current control signal input based upon a value of a current divide signal; and
  a sensor coupled to the switch current regulator, the LED, and a signal feedback circuit, the sensor configured to measure status information regarding the switch current regulator and the LED and provide the status information to a controller via the signal feedback circuit, wherein the status information is used to adjust the voltage on the current control signal input.

19. The circuit of claim 18, wherein the sensor comprises:
  an LED voltage sensor coupled to an anode terminal of the LED and a cathode terminal of the LED, the LED voltage sensor configured to measure a voltage drop across the LED; and
  an LED current sensor coupled to the LED, the LED current sensor configured to measure a current flowing through the LED.

20. The circuit of claim 18, wherein the sensor comprises a switch headroom sensor coupled to the switch current regulator, the switch headroom sensor configured to measure a voltage drop across the switch current regulator.

21. The circuit of claim 18, wherein the sensor comprises a temperature sensor coupled to the LED, the temperature sensor configured to measure a temperature of the LED.

22. The circuit of claim 18 further comprising a strobe signal input coupled to the switching voltage regulator and the sensor, wherein the switching voltage regulator and the sensor are configured to operate only when a signal on the strobe signal input is in an active state.

23. The circuit of claim 18, wherein the current provided to the LED is regulated based upon adjusting the voltage of a current control signal input by a digital-to-analog converter to an operational amplifier with a negative feedback current control loop to the switch current regulator.

* * * * *